United States Patent
Liu et al.

(10) Patent No.: US 7,668,806 B2
(45) Date of Patent: Feb. 23, 2010

(54) PROCESSING QUERIES AGAINST ONE OR MORE MARKUP LANGUAGE SOURCES

(75) Inventors: Zhen Hua Liu, San Mateo, CA (US); Muralidhar Krishnaprasad, Fremont, CA (US); Anand Manikutty, Foster City, CA (US); James Warner, Mountain View, CA (US); Qin Yu, Belmont, CA (US); Hui X. Zhang, Fremont, CA (US); Karuna Muthiah, Redwood City, CA (US); Ying Lu, Sunnyvale, CA (US); Vikas Arora, San Francisco, CA (US); Susan M. Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 289 days.

(21) Appl. No.: 10/948,536

(22) Filed: Sep. 22, 2004

(65) Prior Publication Data

US 2006/0031204 A1 Feb. 9, 2006

Related U.S. Application Data

(60) Provisional application No. 60/599,319, filed on Aug. 6, 2004, provisional application No. 60/599,652, filed on Aug. 5, 2004.

(51) Int. Cl.
*G06F 17/30* (2006.01)
(52) U.S. Cl. .............. 707/3; 707/4; 707/10; 707/102; 707/104.01; 707/200
(58) Field of Classification Search ............... None
See application file for complete search history.

(56) References Cited

U.S. PATENT DOCUMENTS 5,404,513 A 4/1995 Powers et al.

(Continued)

FOREIGN PATENT DOCUMENTS

EP 1 241 589 A2 9/2002

(Continued)

OTHER PUBLICATIONS

Peng, Feng et al., "XPath queries on streaming data", 2003, ACM Press, pp. 431-442.

(Continued)

*Primary Examiner*—Don Wong
*Assistant Examiner*—Shyue Jiunn Hwa
(74) *Attorney, Agent, or Firm*—Hickman Palermo Truong & Becker LLP

(57) ABSTRACT

Techniques are provided for processing a query, including receiving the query, where the query specifies certain operations to be performed, including (a) a first set of one or more operations that are to be performed on a markup language data source and (b) a second set of one or more operations that are to be performed on a second data source. Then it is determined that a first server that manages the markup language data source is capable of performing the first set of operations. A request is sent to the first server to perform the first set of operations. A response is received, where the response contains results of performing the first set of operations on the markup language data source. Finally, results are generated for the query based at least in part on the results of performing the first set of operations.

62 Claims, 4 Drawing Sheets

U.S. PATENT DOCUMENTS

| | | | |
|---|---|---|---|
| 5,680,614 A | 10/1997 | Bakuya et al. | |
| 5,974,407 A | 10/1999 | Sacks | |
| 5,999,941 A | 12/1999 | Andersen | |
| 6,012,067 A | 1/2000 | Sarkar | |
| 6,055,544 A | 4/2000 | DeRose et al. | |
| 6,128,610 A | 10/2000 | Srinivasan et al. | |
| 6,141,655 A | 10/2000 | Johnson et al. | |
| 6,199,195 B1 | 3/2001 | Goodwin et al. | |
| 6,208,993 B1 | 3/2001 | Shadmon | |
| 6,236,988 B1 | 5/2001 | Aldred | |
| 6,240,407 B1 * | 5/2001 | Chang et al. | 707/2 |
| 6,253,195 B1 * | 6/2001 | Hudis et al. | 707/2 |
| 6,263,332 B1 | 7/2001 | Nasr et al. | |
| 6,279,007 B1 | 8/2001 | Uppala | |
| 6,282,537 B1 | 8/2001 | Madnick et al. | |
| 6,343,287 B1 | 1/2002 | Kumar | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,418,448 B1 | 7/2002 | Sarkar | |
| 6,438,540 B2 | 8/2002 | Nasr et al. | |
| 6,449,620 B1 | 9/2002 | Draper et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,510,434 B1 | 1/2003 | Anderson et al. | |
| 6,574,655 B1 | 6/2003 | Libert et al. | |
| 6,584,459 B1 | 6/2003 | Chang et al. | |
| 6,604,100 B1 | 8/2003 | Fernandez et al. | |
| 6,636,845 B2 | 10/2003 | Chau et al. | |
| 6,643,633 B2 | 11/2003 | Chau et al. | |
| 6,654,734 B1 | 11/2003 | Mani et al. | |
| 6,684,204 B1 | 1/2004 | Lal | |
| 6,708,186 B1 | 3/2004 | Claborn et al. | |
| 6,721,727 B2 | 4/2004 | Chau et al. | |
| 6,725,212 B2 | 4/2004 | Couch et al. | |
| 6,772,412 B2 | 8/2004 | Kuznetsov | |
| 6,782,380 B1 | 8/2004 | Thede | 707/2 |
| 6,785,673 B1 | 8/2004 | Fernandez et al. | |
| 6,836,778 B2 | 12/2004 | Manikutty et al. | |
| 6,871,204 B2 | 3/2005 | Krishnaprasad et al. | |
| 6,918,082 B1 | 7/2005 | Gross et al. | |
| 7,028,028 B1 * | 4/2006 | Balmin et al. | 707/4 |
| 7,031,956 B1 | 4/2006 | Lee et al. | |
| 7,043,716 B2 | 5/2006 | Zimmer et al. | |
| 7,062,507 B2 * | 6/2006 | Wang et al. | 707/102 |
| 7,072,896 B2 | 7/2006 | Lee et al. | |
| 7,124,137 B2 * | 10/2006 | Lin et al. | 707/100 |
| 7,139,746 B2 | 11/2006 | Shin et al. | |
| 7,162,485 B2 | 1/2007 | Gottlob et al. | |
| 7,181,438 B1 | 2/2007 | Szabo | |
| 7,448,022 B1 * | 11/2008 | Ram et al. | 717/120 |
| 2001/0037345 A1 | 11/2001 | Kiernan et al. | |
| 2002/0015042 A1 | 2/2002 | Robotham et al. | |
| 2002/0035606 A1 | 3/2002 | Kenton | |
| 2002/0038358 A1 | 3/2002 | Sweatt, III et al. | |
| 2002/0054090 A1 | 5/2002 | Silva et al. | |
| 2002/0056025 A1 | 5/2002 | Qiu et al. | |
| 2002/0073019 A1 | 6/2002 | Deaton | |
| 2002/0087510 A1 | 7/2002 | Weinberg et al. | |
| 2002/0100027 A1 | 7/2002 | Binding et al. | 717/137 |
| 2002/0116371 A1 | 8/2002 | Dodds et al. | |
| 2002/0116457 A1 | 8/2002 | Eshleman et al. | |
| 2002/0120685 A1 | 8/2002 | Srivastava et al. | |
| 2002/0124100 A1 | 9/2002 | Adams | |
| 2002/0133484 A1 | 9/2002 | Chau et al. | |
| 2002/0156772 A1 | 10/2002 | Chau et al. | |
| 2002/0169788 A1 | 11/2002 | Lee et al. | |
| 2002/0184401 A1 | 12/2002 | Kadel, Jr. et al. | |
| 2002/0198874 A1 | 12/2002 | Nasr et al. | |
| 2003/0004937 A1 | 1/2003 | Salmenkaita et al. | |
| 2003/0009361 A1 | 1/2003 | Hancock et al. | |
| 2003/0014397 A1 | 1/2003 | Chau et al. | |
| 2003/0028563 A1 * | 2/2003 | Stutz et al. | 707/513 |
| 2003/0033285 A1 | 2/2003 | Jalali et al. | |
| 2003/0065659 A1 | 4/2003 | Agarwal et al. | |
| 2003/0070144 A1 | 4/2003 | Schnelle et al. | |
| 2003/0101194 A1 | 5/2003 | Rys et al. | |
| 2003/0140308 A1 | 7/2003 | Murthy et al. | |
| 2003/0154204 A1 | 8/2003 | Chen-Wright et al. | |
| 2003/0158897 A1 | 8/2003 | Ben-Natan et al. | |
| 2003/0182624 A1 | 9/2003 | Large | |
| 2003/0200214 A1 | 10/2003 | Doole et al. | |
| 2003/0212662 A1 | 11/2003 | Shin et al. | 707/2 |
| 2003/0233618 A1 | 12/2003 | Wan | |
| 2004/0006563 A1 * | 1/2004 | Zwiegincew et al. | 707/10 |
| 2004/0015783 A1 * | 1/2004 | Lennon et al. | 715/523 |
| 2004/0043758 A1 | 3/2004 | Sorvari et al. | |
| 2004/0060003 A1 | 3/2004 | Mani et al. | |
| 2004/0064466 A1 | 4/2004 | Manikutty et al. | |
| 2004/0088415 A1 | 5/2004 | Chandrasekar et al. | |
| 2004/0143581 A1 * | 7/2004 | Bohannon et al. | 707/100 |
| 2004/0148278 A1 | 7/2004 | Milo et al. | |
| 2004/0167904 A1 | 8/2004 | Wen et al. | |
| 2004/0176958 A1 | 9/2004 | Salmenkaita et al. | |
| 2004/0193575 A1 | 9/2004 | Chen et al. | 707/3 |
| 2004/0199524 A1 * | 10/2004 | Rys et al. | 707/100 |
| 2004/0205082 A1 * | 10/2004 | Fontoura et al. | 707/101 |
| 2004/0215600 A1 | 10/2004 | Aridor et al. | |
| 2004/0220912 A1 | 11/2004 | Manikutty et al. | |
| 2004/0220927 A1 | 11/2004 | Murthy et al. | |
| 2004/0221226 A1 | 11/2004 | Lin et al. | |
| 2004/0225680 A1 | 11/2004 | Cameron et al. | |
| 2004/0230667 A1 | 11/2004 | Wookey | |
| 2004/0260691 A1 * | 12/2004 | Desai et al. | 707/4 |
| 2004/0267719 A1 * | 12/2004 | Doherty et al. | 707/3 |
| 2004/0267760 A1 * | 12/2004 | Brundage et al. | 707/100 |
| 2005/0004892 A1 | 1/2005 | Brundage et al. | |
| 2005/0010896 A1 | 1/2005 | Meliksetian et al. | |
| 2005/0022115 A1 | 1/2005 | Baumgartner et al. | 715/513 |
| 2005/0038688 A1 | 2/2005 | Collins et al. | |
| 2005/0044078 A1 | 2/2005 | DeVries et al. | |
| 2005/0091188 A1 | 4/2005 | Pal et al. | |
| 2005/0097084 A1 | 5/2005 | Balmin et al. | |
| 2005/0102256 A1 | 5/2005 | Bordawekar et al. | |
| 2005/0114314 A1 | 5/2005 | Fan et al. | 707/3 |
| 2005/0138047 A1 | 6/2005 | Liu et al. | 707/100 |
| 2005/0160076 A1 | 7/2005 | Kanemasa | |
| 2005/0160108 A1 | 7/2005 | Charlet et al. | |
| 2005/0165866 A1 * | 7/2005 | Bohannon et al. | 707/203 |
| 2005/0210002 A1 * | 9/2005 | Pal et al. | 707/3 |
| 2005/0228786 A1 | 10/2005 | Murthy et al. | 707/3 |
| 2005/0229158 A1 | 10/2005 | Thusoo et al. | 717/115 |
| 2005/0289125 A1 | 12/2005 | Liu et al. | |
| 2005/0289138 A1 * | 12/2005 | Cheng et al. | 707/5 |

FOREIGN PATENT DOCUMENTS

| | | |
|---|---|---|
| WO | WO 00/49533 A2 | 8/2000 |
| WO | WO 01/33433 A1 | 5/2001 |
| WO | 42881 A2 | 6/2001 |
| WO | WO 01/42881 A2 | 6/2001 |
| WO | WO 01/059602 A1 | 8/2001 |
| WO | WO 01/61566 A1 | 8/2001 |
| WO | WO 01/65419 A2 | 9/2001 |

OTHER PUBLICATIONS

Vion-Dury, Jean-Yves, "XPath on left and right sides of rules: toward compact XML tree rewriting through node patterns", 2003, ACM Press, pp. 19-25.

Daniele Braga et al., "A Graphical Environment to Query XML Data with Query," Proceedings of the Fourth International Conference on Web Information Systems Engineering (WISE '03), 2003, IEEE, 10 pages.

International Preliminary Examination Report, Application No. PCT/US03/35551, Oct. 8, 2004, pp. 1-17.
Written Opinion, Application No. PCT/US03/35551, Nov. 10, 2004, 6 pages.
Current claims in PCT/US03/35551, pp. 1-4.
"A Performance Evaluation of Storing XML Data in Relational Database Management Systems"—Latifur Khan and Yan Rao—ACM-2001 (pp. 31-38).
"From XML Schema to Relations: A Cost-Based Approach to XML Storage"—Bell Laboratories: Philip Bohannon, Juliana Freire, Prasan Roy and Jerome Simeon—IEEE—2002—Proceedings of the 18th International Conference on Data Engineering (ICDE '02), pp. 1-28.
"SRQL: Sorted Relational Query Language"—Ragu Ramakrishnan, Donko Donjerkovic, Arvind Ranganathan, Kevin S. Beyer and Muralidhar Krishnaprasad—Jul. 1-3, 1998, IEEE, pp. 84-95.
"Oracle8i—The XML Enabled Data Management System"—Oracle Corporation: Sandeepan Banerjee, Vishu Krishnamurthy, Muralidhar Krishnaprasad and Ravi Murthy—Mar. 2000, IEEE, pp. 561-568.
Chen, Ruey-Shun et al., "Developing an XML framework for metadata system", Trinity College Dublin, Proc. of the 1st Inter. Sympo. on Information and Communication, pp. 267-272.
Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.
International Preliminary Examination Report, Application No. PCT/US02/30783, Apr. 1, 2004, 15 pages.
Jayavel Shanmugasundaram, et al., "Querying XML Views of Relational Data," Proceedings of the 27th Very Large Databases Conference, Rome, Italy, Sep. 2001, pp. 261-270.
Current claims in PCT/US02/30783, pp. 1-8.
R. Bourret, et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.
Scott Vorthmann, et al., "Beyond Schemas, Schema Adjuncts and the Outside World," Markup Languages, Online!, vol. 2, No. 3, Jun. 2000, pp. 1-8.
Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.
Hansrudi Noser, et al., "Dynamic 3D Visualization of Database-Defined Tree Structures on the WWW by Using Rewriting Systems," 2000, IEEE, XP-002262516, pp. 247-254.
Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.
Josephine Cheng, et al., "IBM DB2 XML Extender, An end-to-end solution for storing and retrieving XML documents.," IEEE, ICDE '00 Conference, San Diego, Feb. 2000, 128 pages.
Jim Melton, "ISO-ANSI Working Draft, XML-Related Specifications (SQL/XML)," WG3: DRS-020, H2-2002-365, Aug. 2002, 154 pages.
Oracle Corporation, "Oracle9i XML Database Developer's Guide—Oracle XML DB," Release 2 (9.2), Mar. 2002, Part No. A96620-1, pp. 10-1-10-54.
W3C, "XML Schema Part 1: Structures," W3C Recommendation, May 2, 2001, retrieved from the internet:<http://www.w3.org/TR/2001/REC-xmlschema-1-20010502/>, retrieved on Apr. 14, 2005, pp. 1-186.
W3C, "XML Schema Part 2: Datatypes," W3C Recommendation, May 2, 2001, retrieved from the internet:<http://www.w3.org/TR/2001/REC-xmlschema-2-20010502/>, retrieved on Apr. 14, 2005, pp. 1-138.
Dayen, I., "Storing XML in Relational Databases", *XML.com*, XP-002275971(1998-2004), pp. 1-13.
Funderbunk, J. et al., "XML programming with SQL/XML and XQuery", *IBM Systems Journal*, XP-002295973 (2002), pp. 642-665.
Hierarchical Queries, XP-002295972, pp. 8-3 to 8-7.
International Searching Authority, "Notification of Transmittal of the International Search Report and the Written Opinion of the International Authority, or the Declaration," Nov. 2, 2004, PCT/US2004/010018, 14 pages.
PCT/US2004/010018—current claims.
W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.
W3C, "XML Path Language (XPath) 2.0," W3C Recommendation, Working Draft, Oct. 29, 2004, retrieved from the internet:<http://www.w3.org/TR/2004/WD-xpath20-20041029>, retrieved on Apr. 14, 2005, pp. 1-111.
W3C, "XML Syntax for XQuery 1.0 (XQueryX)," W3C Recommendation, Working Draft, Dec. 19, 2003, retrieved from the internet:<http://www.w3.org/TR/2003/WD-xquery-20031219>, retrieved on Apr. 14, 2005, pp. 1-55.
Schmidt et al.—"Efficient Relational Storage and Retrieval of XML Documents"—CWI, The Netherlands (pp. 1-6).
"Oracle 9i Project XDB"—The XML Database—Oracle—2001 (pp. 1-18).
Lawrence et al. "Integrating Relational Database Schemas Using a Standardized Dictionary"—2001—ACM (pp. 225-230).
McHugh, Jason et al., "Query Optimization for XML", XP-002333353, *Proceedings of the 25th VLBD Conference* (1999) pp. 315-326.
Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.
Notification of Transmittal of the International Search Report and the Written Opinion of the International Searching Authority, or the Declaration received from International application No. PCT/US2005/011762.
Pending claims from International application No. PCT/US2005/011762.
International Searching Authority, "Notification of Transmittal of the International Search Report and the Written Opinion of the International Searching Authority, or the Declaration," PCT/US2005/021259, dated Nov. 24, 2005, 13 pages.
Current Claims, PCT/US2005/021259, 15 pages.
Choi, Byron et al., "The XQuey Formal Semantics: A Foundation for Implementation Optimization," May 31, 2002, IEEE XP-002353605, 15 pages.
Kang, Ji-Hoon et al., "An XQuery Engine for Digital Library Systems that support XML data," Proceedings of the 2004 International Symposium on Application and the Internet Workshops, IEEE XP-0010684128, 5 pages.
Murthy, Ravi et al., "XML Schemas in Oracle XML DB," Proceedings of the 29th VLDB Conference, 2003, IEEE XP-002353604, pp. 1009-1018.
Shanmugasundaram, Jayavel, et al., "Querying XML Views of Relational Data," Proceedings of the 27th Very Large Databases Conference, Rome, Italy, Sep. 2001, pp. 261-270.
Zhang, Hui et al., "XQuery rewriting at the relational algebra level," Computer Systems Science and Engineering, vol. 18, No. 5, Sep. 2003, IEEE XP-009056809, pp. 241-262.
Zhang, Xin et al., "Honey, I Shrunk the XQuery!—An XML Algebra Optimization Approach," Submission for WIDM'02, IEEE XP-002316448, 14 pages.
Katz, Howard et al., "Integrating XQuery and Relational Database Systems," Chapter 7—*XQuery from the Experts: A Guide to the W3C XML Query Language*, Addison Wesley Professional, Aug. 22, 2003, ISBM 978-0-321-18060-5, pp. 353-391.
Zemke, Fred, "XML Query," Change Proposal, ISO/IEC JTC1/SC32 WG3:SIA-nnn ANSI NCITS H2-2004-02lrl, Mar. 14, 2004, 29 pages.
European Patent Office, "Communication Pursuant to Article 96(2) EPC," App. No. 01 970 715.7 (50277-2177), sated Jul. 19, 2006, 8 pages.
Amended Claims (50277-2177), App. No. 01 970 715.7, 13 pages.

Florescu, Daniela et al., "A Performance Evaluation of Alternative Mapping Schemes for Storing XML Data In A Relational Database," Inria Rocquencourt P Project Rodin—Rapport De Recherche, May 1999, pp. 1-31.

Chen, Cindy Xinmin, et al., "XML Queries SQL," Proceedings of the First International Conference on Web-Age Information Management, ISBN: 3-540-67627-9, 8 pages.

Cheng, Josephine, et al., "XML and DB2," 16th International Conference on Data Engineering, May 2000, 5 pages.

Australian Office Action; Examiner's first report on patent application No. 2001290693, dated Jun. 27, 2006, 4 pgs.

Australian Application No. 2001290693—currnet claims, 17 pgs.

International Preli minary Examining Authority, "Written Opinion," PCT/US2005/021259, dated Oct. 13, 2006, 7 pages.

Current Claims, PCT/US2005/021259, 10 pages.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

IP Australia, "Examiner's Report No. 2,"Patent App. 2001290693, received Mar. 8, 2007, 2 pages.

Current Claims Patent App. 2001290693 (50277-2175), 7 pages.

"Notice of Allowance and Fee Due" received in 10/944,170 dated Apr. 7, 2008, 8 pages.

Office Action from China for foreign patent application No. 200480011704.3 dated Feb. 29, 2008 (6 pgs).

Current claims in China for foreign patent application No. 200480011704.3 (4 pgs).

Oracle 9I-XML Database Developer's Guide-Oracle, XML DB, Release 2(9.2), Part No. A96620-02, Part IV Chapter 10, 10-1~10-21, Shelley Higgins (24 pgs).

Australian Government, "Examiner's first report on patent application No. 2007229359", received Mar. 5, 2008, 2 pages.

Claims, patent application No. 2007229359, 8 pages.

Australian Government, "Examiner's first report on patent application No. 2007229358", received Mar. 5, 2008, 2 pages.

Claims, patent application No. 2007229358, 8 pages.

Damiani, Ernesto et al., "Securing XML Documents", LNCS 1777, Mar. 2000, 15 pages.

Cheng, Josephine, et al., "IBM XML Extender An End to End solution for storing and retrieving XML Documents", IBM Silicon Valley, Copyright IEEE, Feb. 2000, 11 pages.

Damiani, Ernesto, et al., "Design and Implementation of an access control processor for XML documents", Computer Networks 33 (2000), Jun. 2000, 17 pages.

Rollman, Rich, "SQL Server 2000 XML Enhancements", Microsoft Corp., Powerpoint Presentation at Microsoft TechEd, Jun. 2000, 42 pages.

Bourret, R et al., "A Generic load/extract utility for data transfer between XML documents and relational databases", IEEE Jun. 2000, 11 pages.

AU Examiner's Report for foreign application No. 2004237062 dated May 20, 2008 (2 pgs).

Current Claims in AU application No. 2004237062 (4 pgs).

European Patent Office, "Communication Pursuant to Article 94(3) EPC", Application No. 05 760 442.3—2201, dated Jun. 20, 2008, 2 pages.

Claims, Application No. 05 760 442.3—2201, 8 pages.

Japanese Patent Office, "Notice of Grounds of Rejection", Patent application No. 533163/2003, mailed Aug. 19, 2008 / received Aug. 21, 2008, 7 pages.

Claims, Patent application No. 533163/2003, 9 pages.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

Funderburk, J.E., et al., "XML Programming with SQL/XML and XQuery", XP-002353603, IBM Systems Journal vol. 41, No. 4, 2002, 24 pages.

Wan Chang-Xuan; Liu Yun-Sheng: *"X-Restore. Middleware for SML's Relational Storage and Retrieve"* Wuhan University Journal of Natural Sciences, vol. 8, No. 1a, Jan. 1, 2003, pages 28-34, XP007909647.

Fling, Kirby, *"Four ways to work with hierarchical data"* [Online] Dec. 6, 2000, XP007909672 Retrieved from the Internet: URL:http://www.evolt.org/node/4047>, 13 pages.

McHugh, Jason et al., "Query Optimization for XML", XP-002333353, *Proceedings of the 25th VLDB Conference* (1999) pages 315-326.

Yoshikawa, Masatoshi et al., "XRel: a Path-Based Approach to Storage and Retrieval of XML Documents Using Relational Databases", XP-001143686, *ACM Transactions on Internet Technology* (2001), pages 110-141.

Notification of Transmittal of the International Search Report and the Written Opinion of the International Searching Authority, or the Declaration received from International application No. PCT/US2005/011762.

Pending claims from International application No. PCT/US2005/011762.

* cited by examiner

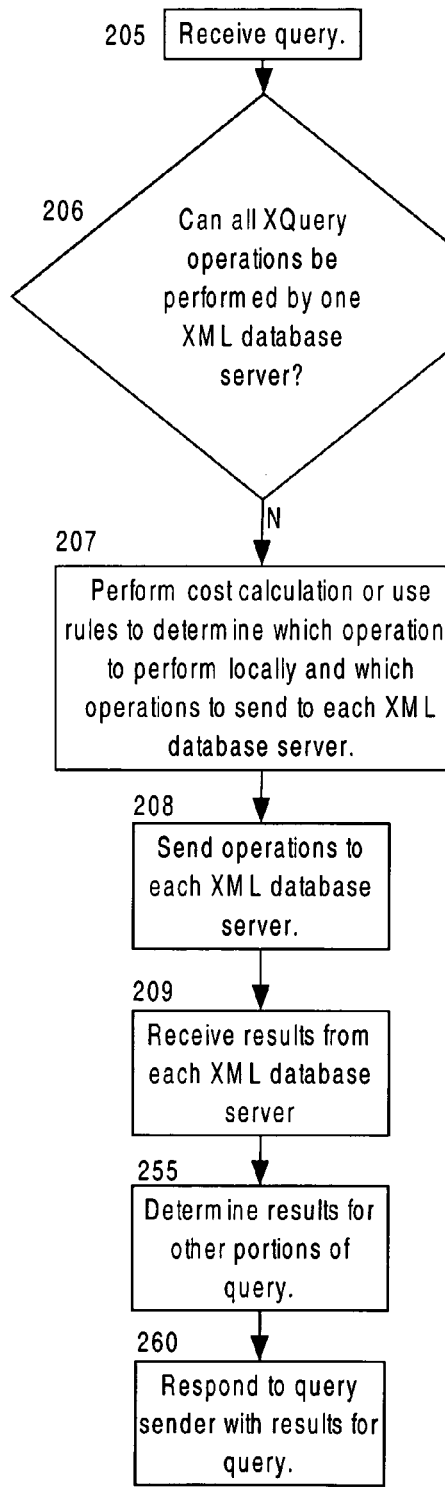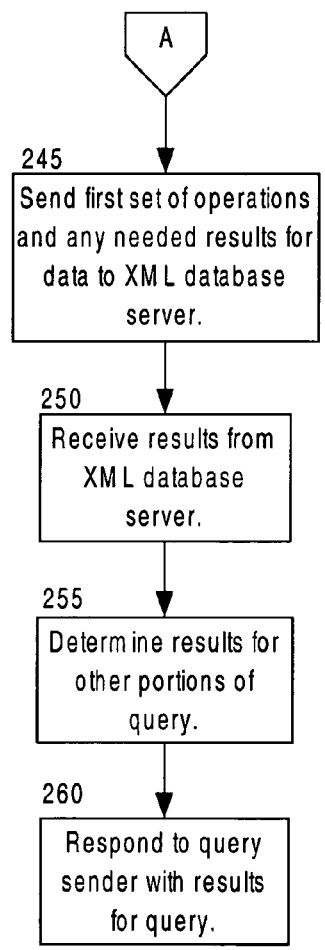
FIG. 2A
FIG. 2B

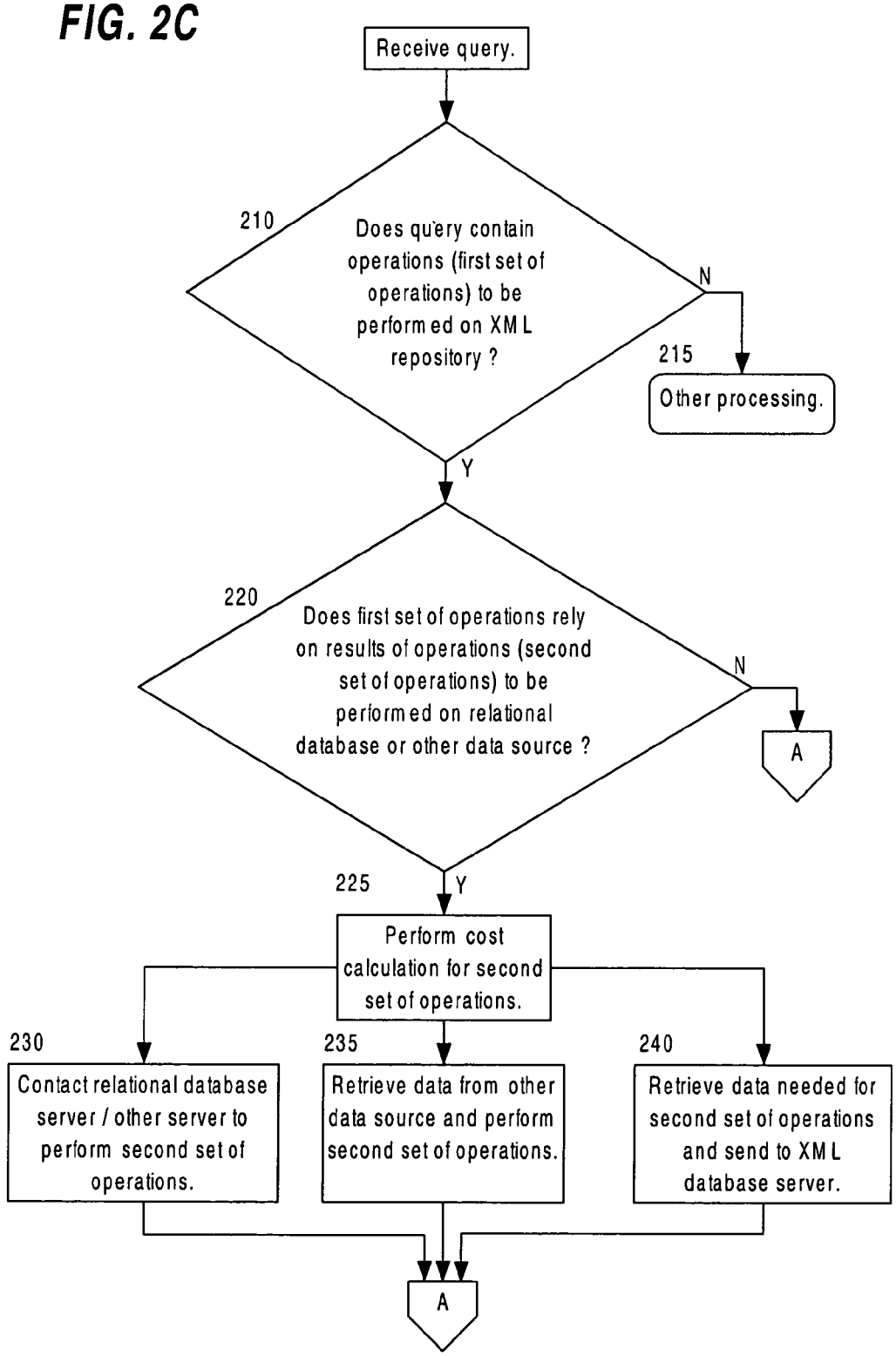

PROCESSING QUERIES AGAINST ONE OR MORE MARKUP LANGUAGE SOURCES

PRIORITY CLAIM

Related Applications

This application is related and claims the benefit of priority to U.S. Patent Application Ser. No. 60/599,319, entitled "EFFICIENT EVALUATION OF QUERIES USING TRANSLATION", filed by Zhen Hua Liu et al. on Aug. 6, 2004, the contents of which are herein incorporated by reference for all purposes as if originally set forth herein, referred to herein as to '2573.

This application claims the benefit of priority to U.S. Provisional Patent Application Ser. No. 60/599,652 filed on Aug. 5, 2004, entitled "PROCESSING QUERIES AGAINST ONE OR MORE MARKUP LANGUAGE SOURCES," by Zhen Hua Liu et al, the entire contents of which are incorporated by reference for all purposes as if originally set forth herein, under 35 U.S.C. § 119(e) and is referred to herein as to '652.

This application is related to U.S. patent application Ser. No. 10/259,278, entitled "MECHANISM FOR MAPPING XML SCHEMAS TO OBJECT-RELATIONAL DATABASE SYSTEMS," filed by Ravi Murthy et al. on Sep. 27, 2002, the contents of which are herein incorporated by reference for all purposes as if originally set forth herein, referred to herein as to '278.

This application is related to U.S. patent application Ser. No. 10/428,878, entitled "TECHNIQUES FOR REWRITING XML QUERIES DIRECTED TO RELATIONAL DATABASE CONSTRUCTS," filed by Anand Manikutty et al. on May 1, 2003, the contents of which are herein incorporated by reference for all purposes as if originally set forth herein, referred to herein as to '878.

This application is related to U.S. patent application Ser. No. 10/428,443, entitled "TECHNIQUES FOR RETAINING HIERARCHICAL INFORMATION IN MAPPING BETWEEN XML DOCUMENTS AND RELATIONAL DATA," filed by Ravi Murthy et al. on May 1, 2003, the contents of which are herein incorporated by reference for all purposes as if originally set forth herein, referred to herein as to '443.

This application is related to U.S. patent application Ser. No. 09/949,020, entitled "METHOD AND APPARATUS FOR XML VISUALIZATION OF A RELATIONAL DATABASE AND UNIVERSAL RESOURCE IDENTIFIERS TO DATABASE DATA AND METADATA," naming as inventors Muralidhar Krishnaprasad et al., filed Sep. 6, 2001, the contents of which are herein incorporated by reference for all purposes as if originally set forth herein, referred to herein as to '020.

This application is related to U.S. patent application Ser. No. 09/948,949, entitled "APPARATUS AND METHOD FOR MAPPING RELATIONAL DATA AND METADATA TO XML," naming as inventors Muralidhar Krishnaprasad et al., filed Sep. 6, 2001, the contents of which are herein incorporated by reference for all purposes as if originally set forth herein, referred to herein as to '949.

This application is related to U.S. patent application Ser. No. 09/948,998, entitled "METHOD AND APPARATUS FOR FLEXIBLE STORAGE AND UNIFORM MANIPULATION OF XML DATA IN A RELATIONAL DATABASE SYSTEM," naming as inventors Muralidhar Krishnaprasad et al., filed Sep. 6, 2001, the contents of which are herein incorporated by reference for all purposes as if originally set forth herein, referred to herein as to '998.

FIELD OF THE INVENTION

The present invention relates to query processing. The invention relates more specifically to processing queries against one or more markup language sources.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Relational database management systems (RDBMS) store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries.

A user retrieves information from and makes updates to a database by interacting with a database application. The user's actions are converted into a query by the database application. The database application submits the query to a database server. The database server responds to the query by accessing the tables specified in the query to determine which information stored in the tables satisfies the query. The information that satisfies the query is retrieved by the database server and transmitted to the database application. Alternatively, a user may request information directly from the database server by constructing and submitting a query directly to the database server using a command line or graphical interface.

Queries submitted to the database server must conform to the syntactical rules of a particular query language. One popular query language, known as the Structured Query Language (SQL), provides users a variety of ways to specify information to be retrieved. Another query language based on the Extensible Markup Language (XML) is XML Query Language (XQuery). XQueryX is an XML representation of the XQuery language. XQuery is described in "XQuery 1.0: An XML Query Language." W3C Working Draft Jul. 23, 2004 at www.w3.org/TR/xquery. XQueryX is described in "XML Syntax for XQuery 1.0 (XQueryX)." W3C Working Draft 19 Dec. 2003 at www.w3.org/TR/xqueryx. Another related technology, XPath, is described in "XML Path Language (XPath) 2.0." W3C Working Draft 12 Nov. 2003 at www.w3.org/TR/xpath20. XQuery and XQueryX may use XPath for path traversal.

In a data-integration environment, an XQuery engine typically runs in the middle-tier engine and offers XQuery service for applications by evaluating the XQuery against various back-end XML data sources. One XML data source may be a simple file system repository storing XML documents as plain files. Another XML data source may be a relational database management system (RDBMS) whose data can be reformatted into XML and returned to the middle-tier engine. The RDBMS is not capable of processing XQuery operations. Therefore, the constructed XML must be returned to the middle-tier engine so that the middle-tier engine may perform the XQuery operations. Another XML data source may be an SQL/XML enabled RDBMS which can natively process XQuery. A further XML data source may be an SQL/XML enabled RDBMS that embeds a file-system repository that contains XML documents.

The XQuery engine running on the middle-tier engine will evaluate the XQuery by pulling the data from the backend XML data sources and processing the XQuery operations against the retrieved XML data. This "one-size-fit-all" approach handles all XQuery operations in the middle-tier XQuery engine. This approach may be inefficient since much of the data retrieved from the XML data source will be filtered once the middle-tier processes the XQuery operations on the data from the XML data source. Therefore, the retrieval of the data from the XML data source may waste considerable bandwidth. Also, because the XML data must be constructed (from the underlying representation into XML) and sent to the middle-tier engine, the middle-tier engine cannot optimize execution of the XQuery operations based on the original storage configuration.

Therefore, there is clearly a need for techniques that overcome the shortfalls of the approach described above.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A, FIG. 2B, and FIG. 2C are flow diagrams that depict techniques for processing queries against one or more markup language sources.

DETAILED DESCRIPTION

Figure 1A:
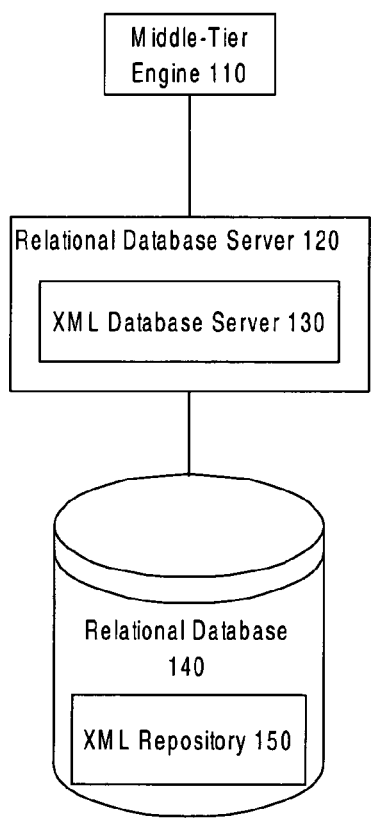
FIG. 1A and FIG. 1B are two block diagrams that depict two possible systems for processing queries against one or more markup language sources.

A method and apparatus for processing queries against one or more markup language sources are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

The techniques described herein are in no way limited to any particular embodiment or aspect of an embodiment. An example embodiment of the techniques described herein is a middle-tier engine that accepts queries that contain operations in one or more of the following formats: SQL, XQueryX, and XQuery. This embodiment is described for illustrative purposes only.

When the middle-tier engine receives a query, it determines whether any portion of the query is in XQuery. The middle-tier engine then determines the data sources needed to perform the XQuery operations. In one embodiment, if a single XML database server cannot perform all of the XQuery operations, then a cost calculation is performed to determine which, if any, XQuery operations to perform locally (based on data retrieved from XML repositories) and which XQuery operations to send to XML database servers. In another embodiment, a set of rules is used to determine which, if any, XQuery operations to perform locally (based on data retrieved from XML repositories) and which XQuery operations to send to XML database servers. The techniques described herein may also include, if one or more particular XQuery operations rely on results from one or more other operations, determining, based on rules or cost, whether to determine the needed results locally or whether to have a database server determine the results.

In one embodiment, if a particular XML database server can perform all of the XQuery operations in the XQuery, then the XQuery operations are sent to the particular XML database server and results are generated for the query based at least in part on the results received from the particular XML database server.

XML Database Operations

Some RDBMSs and object-relational database systems (ORDBMS) support "XML" or "XMLType" as a native datatype. Using XMLType, users can store XML documents in databases via the use of XMLType tables or XMLType columns of tables. Furthermore, users can convert their relational data into XMLType views via the use of SQL/XML publishing functions, such as XMLElement, XMLConcat, etc. XQuery can be used in SQL through a function such as XMLQuery, which enables queries on XMLType values. The XMLTable function enables one to convert XML values (possibly from one or more XMLType columns, or values returned from an XQuery) into virtual relational table. Consider an example where a table called "purchaseOrder" is an XMLType table with each row storing a purchaseOrder XML document instance. Each XML document instance has contents similar to the following:

```
<PurchaseOrder>
    <ShippingAddress>345 35 Ave, Berkeley, CA 94613<ShippingAddress>
    <items>
        <lineitem><name>XQuery Book</name><price>46</price>
        </lineitem>
        <lineitem><name>SQL / XML Guide</name><price>78</price>
        <lineitem>
    </items>
</PurchaseOrder>
```

The following SQL statement with XQuery embedded in the XMLQuery( ) function finds the ShippingAddress of all the purchaseOrder XML document instances which have a purchase item whose price is greater than forty-five:

```
select xmlquery('for $i in /PurchaseOrder where
    $i/items/lineitem/price > 45 return
    $i/ShippingAddress' passing value(p) returning content)
    from purchaserOrder p;
```

Here is an example of converting the XML document instance into relational tables via XMLTable construct:

```
select xt.name, xt.price
from purchaseOrder p, xmltable('/PurchaseOrder/items/lineitem'
passing value(p)
            columns
                name varchar2(20) path 'name',
                price number path 'price') xt;
```

System Overview

Figure 1B:
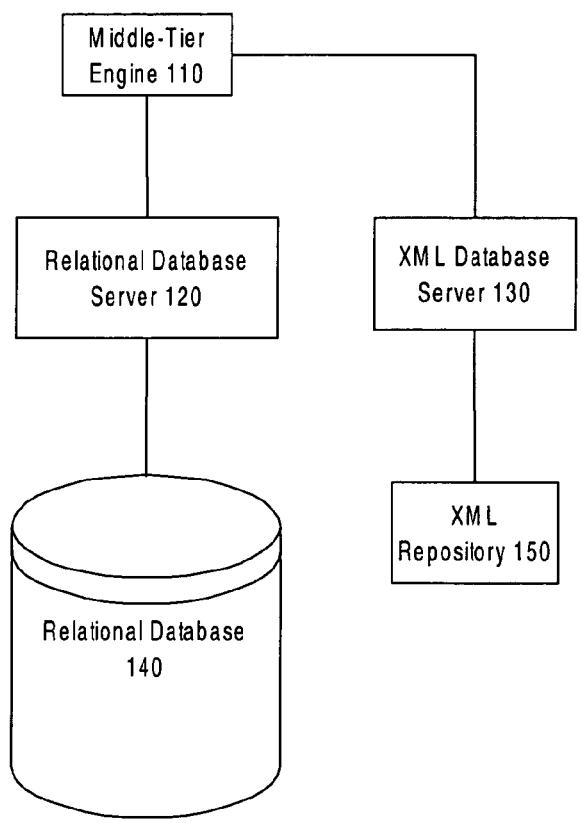

FIG. 1A and FIG. 1B are two block diagrams that depict two possible systems for processing queries against one or more markup language sources.

FIG. 1A includes a relational database server 120 communicatively coupled to a middle-tier engine 110 and a relational database 140. The relational database server 120 comprises an XML database server 130. The relational database 140 comprises an XML repository 150. An XML repository 150 may be any XML repository including XML files stored in a file system or hosted by a database. An XML repository 150 may also be data stored in a form other than XML, where that data can be transformed into XML. For example, the XML repository 150 may be data, stored in a relational database 140, that can be transformed and provided in XML form. Each of the middle-tier engine 110, relational database server 120, XML database server 130, relational database 140, and XML repository 150 is a logical machine. Each logical machine may run on separate physical computing machines or may be running on the same physical computing machine as one or more of the other logical machines. Various embodiments of computers and other physical and logical machines are described in detail below in the section entitled Hardware Overview. In various embodiments, coupling is accomplished by direct cabling, wireless networking, local area networks (LANs), wide area networks (WANs), wireless local area networks (WLANs), the Internet, or any appropriate communication mechanism.

The relational database server 120 may receive SQL queries from the middle-tier engine 110 and execute them against the relational database 140. The middle-tier engine 110 may be a database application, an application server, or an application layer that acts as a conduit between an application server or database application and the database servers 120 and 130. The relational database server 120 may comprise one or more processes, on one or more computers, that control access to and enable querying of the relational database 140.

The XML database server 130 may receive XQuery, XQueryX or any appropriate query to be performed on the XML repository 150 from the middle-tier engine 110 or the relational database server 120. The XML database server 130 may also receive queries to be performed on the XML repository 150 from the relational database server 120. The XML database server 130 may comprise one or more processes, on one or more computers, that may perform queries against the XML repository 150. The XML repository 150 may include XML data stored in the relational database 140, one or more XML files stored in a file system possibly with reference to those files stored in the relational database 140, or any other appropriate XML data source.

FIG. 1B depicts an alternative embodiment which has all of the same components as described above wherein the relational database server 120 is communicatively coupled to the middle-tier engine 110 and the relational database 140; and the XML database server 130 is communicatively coupled to the middle-tier engine 110 and the XML repository 150. FIG. 1B depicts an embodiment in which the XML database server 130 is implemented separately form the relational database server 120 and the XML repository 150 is stored separately from the relational database 140.

As depicted in the two FIGS. 1A and 1B, the XML database server 130 may be implemented as part of the relational database server 130 or may be implemented as a separate logical machine from the relational database server 120. The XML database server 130 and the relational database server 120 may execute on the same physical machine (as in FIG. 1A) or on separate physical machines (FIG. 1B).

In the descriptions above, a relational database 140 and an XML repository 150 are depicted. The techniques described herein are in no way limited to using a relational database 140 or an XML repository 150. In other embodiments, the relational database server 120 may be any software unit 120 configured to provide query execution on a relational data source 140. For example, the relational data source may be an object relational data source 140 and the relational database server 120 may be an object relational database management server (ORDBMS) 120. Similarly, the XML repository 150 may be any XML data source 150 and the XML database server 130 may be any software unit 130 configured to provide access to or execute queries against the XML data source 150. For example, in one embodiment, an XML server software unit 130 may provide the ability to execute XQuery queries on the XML data source 150, where the XML data source 150 includes XML files stored on a machine-readable medium.

Functional Overview

FIG. 2A, FIG. 2B, and FIG. 2C are flow diagrams that depict techniques for processing queries against one or more markup language sources. Two example techniques and variants thereof are described below with respect to (1) FIG. 2A combined with FIG. 2B and (2) FIG. 2C combined with FIG. 2B.

First Example Technique

FIG. 2A combined with FIG. 2B depict a first technique for processing queries against one or more markup language sources. In the embodiment, the middle-tier engine 110 receives a query with embedded XQuery (step 205). The middle-tier engine 110 may receive the query from an application. The query may include operations that are to be performed on the relational database 140, the XML repository 150, or both. The operations in the query may be in any appropriate query language such as XQuery, XQueryX, or SQL. Upon receiving the query, the middle-tier engine 110 may parse and compile the query and determine whether the XQuery is valid.

In step 206, the middle-tier engine 110 determines what data sources are needed to execute the query and determines whether all of the XQuery operations in the query can be handled by a single XML database server 130. If a single XML database server 130 is capable of handling the XQuery operations, then, in step 245, the XQuery operations and any data needed to perform the XQuery operations are sent to the XML database server 130. In some cases the XQuery operations may require results from one or more other operations in the query. Examples of providing results or data needed by the XQuery operations are described below with respect to steps 220-240. Results may be generated in any appropriate form, including plain text, binary form, and compressed form.

In step 250, the XML database server 130 performs the XQuery operations against an XML repository 150 and returns the results to the middle-tier engine 110. The XQuery operations to be sent to the XML database server may be rewritten from XQuery format to XQueryX format. Rewriting the first set of operations from XQuery to XQueryX may reduce the overall execution time of the query if operations in XQueryX are more efficiently parsed by the XML database server than are XQuery operations.

If the XML database server 130 can interpret XQuery or XQueryX operations directly, XQuery or XQueryX commands may be sent directly to the XML database server. If the XML database server 130 cannot, however, interpret XQuery or XQueryX operations directly, the operations may need to be rewritten or encapsulated in SQL or another query language that the XML database server 130 can support. In some cases, the XML database server 130 is an SQL/XML-enabled database server 130 and the XQuery operations are sent to the SQL/XML-enabled database server 130 using one of the two techniques (where dual is a one row table):

(1) select XMLQuery(XML Query string) from dual;

(2) select*from XMLTable(XML Query string);

Each of these two techniques (1) and (2) enable the transport of XQuery operations to the SQL/XML-enabled database server 130. In (1), the XQuery operations contained in the XMLQuery function are executed and results are returned as the results of the SQL select statement. In (2), the XQuery operations are executed, and the XMLTable function transforms the results of the XQuery operations into a form usable as a table in the SQL query.

In step 255, results for other portions of the query are determined. Step 255 may include sending one or more other sets of query operations from the other portions of the query to an XML database server 130, to the relational database server 120, or to any other appropriate server capable of executing the particular operations. The "other portions" of the query may include XQuery operations that are to be performed by a different XQuery server 130 or by a relational database server 120. For example, in executing the entire query, it may be necessary to execute all operations in the query. Therefore, step 255 may include sending the operations not handled by the techniques described herein to the appropriate database server 120 or 130 for execution.

Step 255 may also involve retrieving data needed for one or more query operations and either executing the one or more other query operations or sending the data along with the query operations to an XML database server, a relational database server 120, or any other appropriate query operation execution engine. The data may be retrieved from any appropriate data source, such as the XML repository 150 or the relational database 140. Step 255 may also include combining all of the results for all of the operations in the query in order to form complete results for the query received in step 205.

In step 260, the results for the query are sent to the entity that originally sent the query. For example, if a database application sent the query to the middle-tier engine 110 in step 205, then, in step 260, the results for the query are sent back from the middle-tier engine to the database application.

If the XQuery cannot be handled by a single XML database server 130 (as determined in step 206), then costs are determined for various query execution plans in step 207. A query execution plan defines which server will perform particular query operations and in what order the servers will perform them. The various query execution plans may include sending XQuery operations to one or more XML database servers 130, sending relational query operations to one or more relational database servers 120, retrieving data from one or more XML repositories 150 or relational databases 140, or performing one or more XQuery operations on the middle-tier engine. The cost function used to determine the costs for each of the execution plans may be any appropriate function of bandwidth usage, estimated execution time, or other appropriate query parameters. Once the costs for various query execution plans are determined, then the query execution plan with the lowest cost is chosen.

Alternatively, step 207 may include using one or more rules to determine which query execution plan, among multiple execution plans, to use for execution of the query. The techniques described herein are in no way limited to any particular choice of cost calculation or rules.

In step 208, various XQuery operations are sent to the various XML database servers 130 based on the chosen query execution plan from step 207. If the XQuery operations need data from other portions of the query, then step 208 may also include sending results or data to the XML database server 130 along with the XQuery operations as described below with respect to steps 220-240.

In step 209 the results are received from each XML database server 130, results for any other portions of the query are determined and compiled into a single set of results for the query (step 255) and the results for the query are sent to the entity that originally sent the query (step 260). Various embodiments of step 255 and 260 are described above.

Second Example Technique

FIG. 2B combined with FIG. 2C depict a second technique for processing queries against one or more markup language sources.

In step 205, a query is received. For example a middle-tier engine 110 receives a query from a database application. The query may include operations that are to be performed on the relational database 140, the XML repository 150, or both. The operations in the query may be in any appropriate query language such as XQuery, XQueryX, or SQL.

In step 210, a check is performed to determine if the query contains operations to be performed on the XML repository. In order to determine whether the query includes operations to be performed on the XML repository 150, the query may be parsed or otherwise searched in order to determine whether any of the operations in the query rely on the XML repository 150. For clarity in discussion, the operations to be performed on the XML repository 150, if they exist, will be termed the "first set of operations".

Step 210 may also include determining whether the XML database server 130 is capable of performing the first set of operations. In one embodiment, the first set of operations is limited to those operations that the XML database server 130 is capable of performing. A cost calculation may also be performed to determine whether the it would be more or less expensive (in terms of time or CPU) to have the XML database server 130 perform each particular operation or sets of operations or whether the middle-tier engine 110 or any other server (e.g. the relational database server 120) could perform the operations for less time or CPU cost. In one embodiment, the first set of operations is limited to the operations for which the XML database server can produce results at a cost that is better than the cost of producing the same results at any alternative server (e.g. the middle-tier engine 110 or relational database server 120).

In an embodiment where there are multiple XML repositories 150 and a single XML database server 130 is capable of performing the first set of operations on each of the XML repositories 150. In the embodiment, step 210 includes assigning to the first set of operations any operations that are to be performed on the multiple XML repositories 150 on which the XML database server 130 may perform operations and later sending these operations to the XML database server 130 (in step 245). In a related embodiment, the XML database server 130 is one of multiple SQL/XML-enabled database servers 130 and each of these SQL/XML-enabled database servers 130 are communicatively coupled with database links. The SQL/XML-enabled database servers 130 may be capable of processing SQL queries with embedded XQuery or XQueryX. The database links enable the SQL/XML-enabled database servers 130 to remotely query the XML repositories 150 associated with each SQL/XML-enabled database server 130. In such an embodiment, the first set of operations may include all of the operations to be performed on any of the SQL/XML-enabled database servers 130. The first set of operations can later be sent to one of the SQL/XML-enabled database servers 130 (step 245) and that SQL/XML-enabled database server 130 may execute all of the first set of operations against the XML repositories 150 associated with the multiple SQL/XML-enabled database servers 130 by utilizing the remote query capabilities.

If there are no operations to be performed on the XML repository, then "other processing" is performed on the query in step 215. The "other processing" may include determining that there are operations to be performed on the relational database 140 and passing those operations as part of an SQL query to the relational database server 120. If there are no operations to be performed on any known data source, then step 215 may comprise sending an error message from the middle-tier engine 110 back to the database application that originally sent the query. The error message may include wording that indicates that no data source or server was known or available for the operations to be performed in the query.

If the query does contain operations to be performed on the XML repository 150, then, in step 220, a check is performed to determine whether the first set of operations rely on results of operations to be performed on the relational database 140 or other data sources. These operations on whose results the first set of operations rely, if they exist, are called "the second set of operations". For example, the query received in step 205 may contain operations to be performed on the XML repository 150 and those operations rely on the results of a second set of operations that are to be performed on the relational database 140.

If the first set of operations relies on the results of the second set of operations, then, in step 225, a cost analysis may be performed to determine whether to have the appropriate server (e.g. the relational database server 120) perform the second set of operations (step 230); whether to retrieve the data from the data source (e.g. the relational database 140) and perform the second set of operations locally (step 235); or whether to retrieve the data needed for the second set of operations and send that data to the XML database server 130 along with the query containing the first set of operations and second set of operations and have the XML database server 130 perform both the first set of operations and the second set of operations (step 240). Each of the execution plans (steps 230, 235, and 240) will produce the same query result. Each of the execution plans may have a different benefit. For example, if the second set of operations are to be performed on the relational database server 120 and the "size" of data needed to analyze the second set of operations is much greater than the size of the result, then it may be beneficial to have the relational database server 120 perform the second set of operations (step 230) as it will, among other things, save bandwidth by not having the relational database server 120 send the large amount of needed data to the middle-tier engine 110. Therefore, if the cost estimation in step 225 shows that the size of data needed to perform the operations is much greater than the size of data that will be produced as the results of the second set of operations, then step 230 may be performed.

On the other hand, if the data needed for the second set of operations is from a data source that has no server associated with it (e.g. an XML file with no XML server associated with it), then it may be necessary to retrieve the data and perform the second set of operations at the middle-tier engine 110 (step 235). It may also be determined, for example, that the XML database server 130 may be able to efficiently perform the second set of operations, and therefore the middle-tier engine 110 may retrieve the data needed for the second set of operations and send the data to the XML database server along with the query containing the first set of operations and the second set of operations (step 240). The XML database server 130 would then perform the second set of operations on the data it receives and perform the first set of operations based on the results of the second set of operations and the contents of the XML repository 150 (steps 240, 245, and 250).

Once step 230, 235, or 240 has been performed, or if there is no second set of operations (from step 220), then, in step 245, a query containing the first set of operations and any needed data or results are sent to the XML database server 130. The XML database server 130 then performs the first set of operations and returns the results to the middle-tier engine 110 in step 250. Step 245 and step 250 are described in more detail above.

The middle-tier engine 110 then determines results for any other portion of the query (as described above for step 255) and returns the result to the query sender (as described above for step 260).

In FIGS. 2A, 2B, and 2C certain steps and certain order of steps are depicted. The techniques described herein are in no way limited to performing all of these steps nor are the techniques limited to performing any of these steps in any particular order. For example, in one embodiment, after the query is received (step 205), the middle-tier engine 110 performs a check to determine whether there are any operations to be performed on the XML repository 150 that the XML database server 130 is cable of performing—a "first set of operations" (step 210). The first set of operations are then sent to the XML database server 130 (step 245), and the XML database server 130 performs the operations on the XML repository 150. The middle-tier engine 110 then receives the results of performing the first set of operations from the XML database server 130 (step 250). The middle-tier engine then determines (as descried above) the results for the rest of the operations in the query and combines the results (step 255).

The examples of the techniques described herein refer to specific architectural elements in one or more particular arrangements, with each architectural element performing particular tasks. The techniques described herein are in no way limited to the depicted architectural elements. Nor are the techniques described herein restricted to the particular distribution of tasks among the architectural elements. For example, the relational database server 120 may perform all of the tasks attributed to the middle-tier engine 110 and the middle tier server 110 may not be implemented or included in the system. Additionally, the techniques described herein are not limited to particular types of data sources. The XML repository may be one or more XML files in a file system, one or more records in a database, a streaming XML data source, or may be any other appropriate XML data source. The techniques described herein are also not limited to the use of XML. The XML repository may be in any appropriate format or markup language such as Geography Markup Language (GML) or Locale Data Markup Language (LDML).

The relational database server 120 and relational database 140 were included in the description for illustrative purposes only. The technique described herein may be used with any relational data source including, for example, a distributed relational database.

The techniques described herein enable improved query processing for queries that contain operations to be performed on markup language data sources. In particular, various embodiments of the techniques described herein may reduce the network bandwidth used in processing the query by reducing the amount of XML data transferred across the network. Another benefit of various embodiments of the techniques described herein is faster query processing, since the XML Server may be able to optimize the execution of the XQuery operations based on knowledge of how the XML data is stored in the XML repository.

Specific Examples

Querying Documents Via an SQL/XML-Enabled Database Server

In one example, a middle-tier engine 110 receives an XQuery from a database application. The query contains XQuery operations to be performed on XML documents stored in an SQL/XML-enabled database server 130. The SQL/XML-enabled database server 130 stores XML document purchaseorders.xml, which is accessible via URI: /public/finance/purchaseorders.xml, that has the following contents:

```
<Purchaseorders>
 <PurchaseOrder @pid = 3456>
   <ShippingAddress>3456 35 Ave, Berkeley, CA
   94406</ShippingAddress>
   <items>
    <lineitems><bookname>Java Programming</bookname></lineitems>
    <lineitems><bookname>Introduction to XQuery</bookname>
    </lineitems>
   </items>
 </PurchaseOrder>
 <PurchaseOrder @pid = 3478>
   <ShippingAddress>67 Grant Street, Hayward, CA
   94632</ShippingAddress>
   <items>
    <lineitems><bookname>intro to XML</bookname></lineitems>
    <lineitems><bookname>Intro to XQuery</bookname></lineitems>
    <lineitems><bookname>Intro to SQL /
    XMLX</bookname></lineitems>
   </items>
 </PurchaseOrder>
</Purchaseorders>
```

The received XQuery finds all shipping addresses for all purchaseorders which include more than 2 line items:

```
for $i in
doc('/public/finance/purchaseorders.xml')//PurchaseOrder[count(items/
lineitems) > 2]
   return $i/ShippingAddress
```

The middle-tier engine 110 determines that the operation can be performed by SQL/XML-enabled database server 130 (step 206), and rewrites the XQuery into the following SQL statement which is sent to the SQL/XML-enabled database server 130 (step 245):

```
select * from XMLTable(
  'for $i in
  doc("/public/finance/purchaseorders.xml")//PurchaseOrder[count(items/
  lineitems) > 4] return $i/ShippingAddress'
         )
```

The SQL/XML-enabled database server 130 then executes the query and returns the results to the middle-tier engine 110 (step 250). Since these are the only results required for the query, the results can be sent to the database application (step 260).

Querying XML Constructed from Relational Data

In another example, a middle-tier engine 110 receives a query that contains XQuery operations that are to be performed against an XML repository 150 via an SQL/XML-enabled database server 130. The underlying data needed for the query is actually-stored in a relational table, "EMP", with the following contents:

| EMPNO | ENAME | JOB |
|---|---|---|
| 7839 | KING | PRESIDENT |
| 7844 | TURNER | SALESMAN |
| 7876 | ADAMS | CLERK |
| 7900 | JAMES | CLERK |
| 7902 | FORD | ANALYST |

The contents of the EMP table may be reformed by the SQL/XML-enabled database server 130 as the following XML data fragment:

```
<ROW>
    <EMPNO>7839</EMPNO>< ENAME>KING</ENAME>
    <JOB>PRESIDENT</JOB>
</ROW>
<ROW>
    <EMPNO>7844</EMPNO>< ENAME>TURNER</ENAME>
    <JOB>SALESMAN</JOB>
</ROW>
<ROW>
    <EMPNO>7876</EMPNO>< ENAME>ADAMS</ENAME>
    <JOB>CLERK</JOB>
</ROW>
<ROW>
    <EMPNO>7900</EMPNO>< ENAME>JAMES</ENAME>
    <JOB>CLERK</JOB>
</ROW>
<ROW>
    <EMPNO>7902</EMPNO>< ENAME>FORD</ENAME>
    <JOB>ANALYST</JOB>
</ROW>
```

The following XQuery query returns the "ename" elements of the XML data whose "Job" element content is 'ANALYST':

for $i in ora:view('EMP')/ROW where $i/JOB='ANALYST' return $i/ename

Here "ora:view( )" is an XQuery function, provided by the SQL/XML-enabled database server 130, that returns the data from the relation table in XML form (as illustrated above).

The middle-tier engine 110 rewrites the XQuery into the following SQL statement which is sent to and executed by the SQL/XML-enabled database server 130:

select * from xmltable('for $i in ora:view('EMP')/ROW where $i/JOB = 'ANALYST' return $i/ename');

Sending an XQuery to an XML Server

In a third example, the middle-tier engine 110 receives an XQuery query that can be processed by a single SQL/XML-enabled database server 130:

```
for $i in ora:view('PTAB2'), $j in ora:view('PTAB3')
    where $j//@pono = $i//@pono
    return $j//ShipAddress
```

The query is rewritten as SQL/XML and sent (in step 245) to the SQL/XML-enabled database server 130 as:

```
select * from xmltable(' for $i in ora:view('PTAB2'),
    $j in ora:view('PTAB3')
        where $j//@pono = $i//@pono
        return $j//ShipAddress');
```

The SQL/XML-enabled database server 130 then executes the query against the XML repository 150 and return the results to the middle-tier engine 110 (step 250). The results are then sent to the entity that sent the original query (step 260).

Sending Part of an XQuery to an XML Server

In this example, the middle-tier engine 110 receives a query in XQuery and only a portion of the XQuery operations can be performed by the SQL/XML-enabled database server 130 (determined in step 206). The query is:

```
for $i in doc('/private/purchaseorder.xml')/PurchaseOrder
    for $j in ora:view('PTAB2')
        where $j//@pono = $i//@pono
        return $j//ShipAddress
```

An external file repository (not the XML repository 150 or the relational database 140) stores the XML file '/private/purchaseorder.xml.' The external file repository is not hosted by the SQL/XML enabled database server 130. The SQL/XML enabled database server 130 hosts the relational table PTAB2.

A cost calculation is performed and one of the following two scenarios is chosen (step 207).

Scenario A: The middle-tier engine 110 retrieves the data ('/private/purchaseorder.xml') from the external file repository. The middle-tier engine 110 converts the received query to the following SQL/XML query:

```
select * from xmltable('for $j in ora:view("PTAB2") where $j//@pono =
$ext//@pono return $j//ShipAddress' passing :1 as "ext");
```

In this SQL/XML example, the host variable ":1" refers to the external PurchaseOrder data ('/private/purchaseorder.xml') retrieved from the external file repository.

The middle-tier engine 110 then sends the retrieved data and the SQL/XML query to the SQL/XML enabled database server 130 (step 245). The SQL/XML enabled database server 130 executes the query against the XML repository 150 and the data sent from the middle-tier engine 110, and sends the results to the middle-tier engine 110 (step 250).

Scenario B: In another execution plan, the portion of the query that can be executed by the SQL/XML enabled database server 130 is reformed as the following SQL/XML query and sent to the SQL/XML enabled database server 130 without the data retrieved from the external file repository (step 245):

select*from xmltable('for $j in ora:view("PTAB2") return $j//ShipAddress');

The SQL/XML enabled database server 130 executes the SQL/XML query against the XML repository 150 and returns the results to the middle-tier engine (step 250). The middle-tier engine 110 then executes the WHERE clause form the original query against the data received from the SQL/XML enabled database server 130 (step 255) to determine the final results for the query. The results for the query are then returned to the entity that originally sent the query.

The choice of whether to follow Scenario A or Scenario B may be based on a cost calculation or based on one or more rules (described above with respect to step 207).

Hardware Overview

Figure 3:
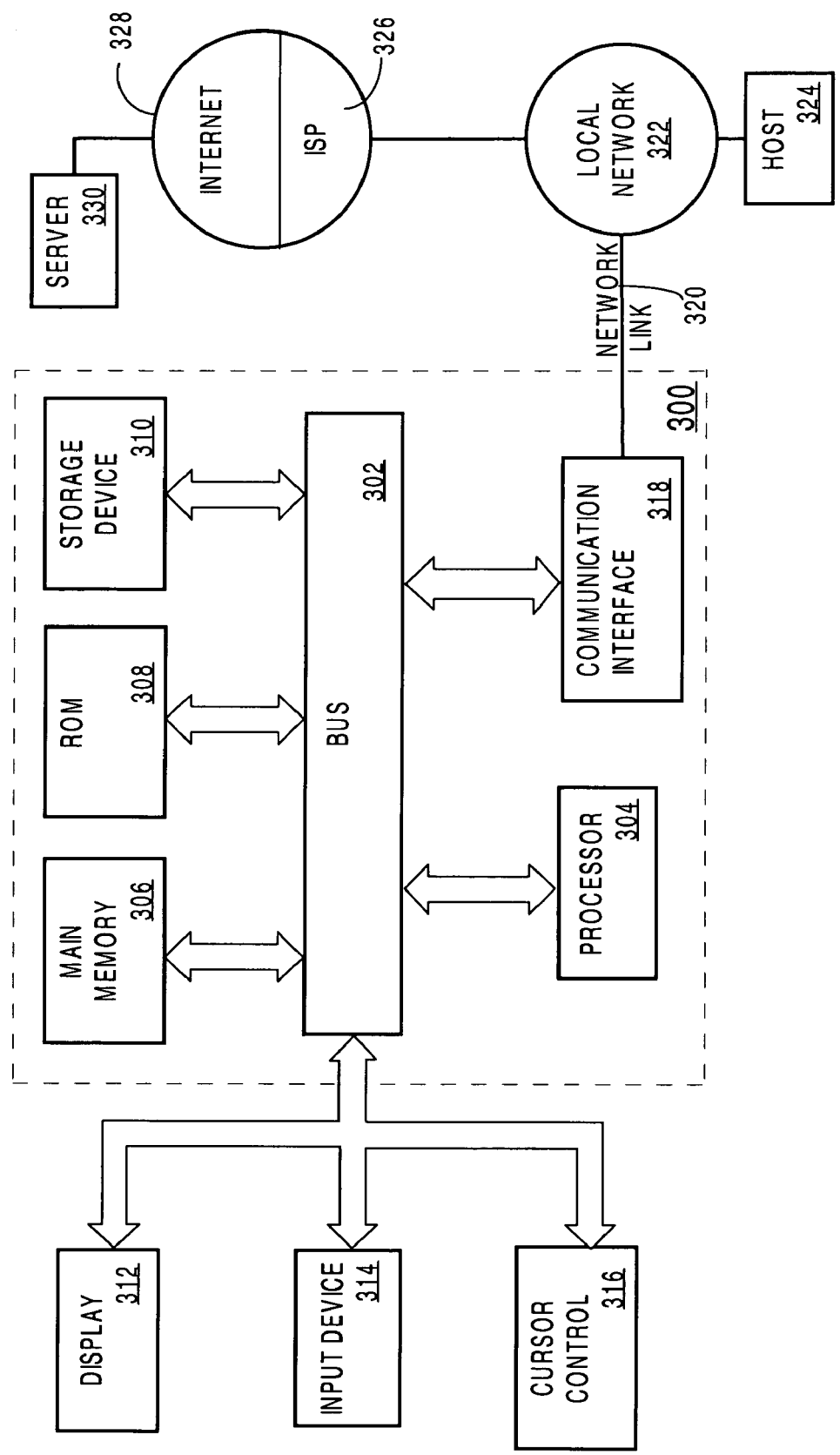
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302.

Common forms of machine-readable media include, for example, a floppy disk, a flexible disk, hard disk, magnetic tape, or any other magnetic medium, a CD-ROM, any other optical medium, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, carry the digital data to and from computer system 300.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of processing a query, comprising the computer-implemented steps of:

receiving the query, wherein the query specifies certain operations to be performed, wherein the certain operations comprise a first set of one or more operations that are to be performed on a markup language data source;

wherein the first set of one or more operations includes a second set of one or more operations;

determining that the first set of one or more operations can be performed at any one of a plurality of entities;

wherein the plurality of entities includes one or more of an XML database server, a relational database server, and a middle-tier engine;

generating a plurality of execution plans for executing the query, wherein the plurality of execution plans include:

a first execution plan indicating a first entity at which the second set of one or more operations are to be performed; and a second execution plan indicating a second entity at which the second set of one or more operations are to be performed;

selecting, based on a particular set of criteria, a particular execution plan from the plurality of execution plans;

wherein selecting the particular execution plan from the plurality of execution plans comprises one or more of:

selecting the particular execution plan based at least in part on costs determined for the plurality of execution plans; and selecting the particular execution plan by using one or more rules to determine which execution plan, of the plurality of execution plans, to use for executing the query;

wherein the selected particular execution plan indicates a first server at which the second set of one or more operations are to be performed;

determining that a third set of one or more operations are to be performed at the middle-tier engine, wherein the first set of one or more operations include all operations in the third set of one or more operations, and the third set of one or more operations include no operation that are in the second set of one or more operations;

sending a request to the first server to perform the second set of one or more operations;

receiving a response to the request, wherein the response contains results of performing the second set of one or more operations on the markup language data source; and generating results for the query based at least in part on the results of performing the second set of one or more operations;

wherein the steps of generating the plurality of execution plans and selecting the particular execution plan are performed by one or more computing devices.

2. The method of claim 1, wherein selecting based on the particular set of criteria comprises:
   determining a first set of costs associated with performing the first set of one or more operations at the first server;
   determining a second set of costs associated with performing the first set of one or more operations at the middle-tier engine; and
   wherein the particular set of criteria comprises the first set of costs and the second set of costs.

3. The method of claim 1, wherein selecting based on the particular set of criteria comprises determining, based on the one or more rules, that the second set of one or more operations are to be performed at the first server.

4. The method of claim 3, wherein selecting based on the one or more rules comprises determining that the first server is capable of performing all of the certain operations; and wherein the second set of one or more operations comprises all operations in the first set of one or more operations, and the first set of one or more operations comprises all of the certain operations.

5. The method of claim 1, wherein the second set of one or more operations comprises fewer than all operations in the first set of one or more operations.

6. The method of claim 1, wherein the particular set of criteria comprise an indication that first server is capable of performing the second set of one or more operations.

7. The method of claim 1, wherein the certain operations comprise a fourth set of one or more operations that are to be performed on a second data source; and wherein the method further comprises:
   determining that a second server associated with the second data source is capable of performing the fourth set of one or more operations;
   sending a second request to the second server to perform the fourth set of one or more operations;
   receiving a second response to the second request, wherein the second response comprises results of performing the fourth set of one or more operations on the second data source; and
   wherein the generating step comprises generating results for the query based at least in part on the results of performing the first set of one or more operations and the results of performing the fourth set of one or more operations.

8. The method of claim 1, wherein the markup language data source is an XML data source and the first server is capable of processing at least one of XQuery, XQueryX, and XPath formats.

9. The method of claim 1, wherein the certain operations comprise a fourth set of one or more operations that are to be performed on a second data source; and wherein the second data source is a relational database.

10. The method of claim 1, wherein the certain operations comprise a fourth set of one or more operations that are to be performed on a second data source; and wherein the second data source is a second markup language data source.

11. The method of claim 1, wherein the first server is an SQL/XML enabled database server; and wherein sending the request to the first server comprises sending the second set of one or more operations to the first server in the form of an SQL statement with embedded XML Query operations.

12. The method of claim 11, wherein the SQL statement with embedded XML Query operations comprises an SQL statement utilizing an XMLTable construct.

13. The method of claim 11, wherein the SQL statement with embedded XML Query operations comprises the second set of one or more operations indicated in an argument of an XMLQuery statement.

14. The method of claim 1, wherein the certain operations comprise a fourth set of one or more operations that are to be performed on a second data source; and wherein the method further comprises:
   determining that the first set of one or more operations requires results from the fourth set of one or more operations;
   retrieving data related to the fourth set of one or more operations from the second data source; and
   wherein the request sent to the first server comprises the data related to the fourth set of one or more operations from the second data source; and
   wherein the results of performing the first set of one or more operations on the markup language data source are based at least in part on the first server performing the fourth set of one or more operations on the data related to the fourth set of one or more operations from the second data source.

15. The method of claim 1, wherein the certain operations comprise a fourth set of one or more operations that are to be performed on a second data source; and wherein the method further comprises:
   determining that the first set of one or more operations require results from the fourth set of one or more operations;
   retrieving data related to the fourth set of one or more operations from the second data source; and
   performing, at the middle-tier engine, the fourth set of one or more operations on the data related to the fourth set of one or more operations, wherein the middle-tier engine is distinct from the first server; and
   wherein the request sent to the first server comprises the results of the middle-tier engine performing the fourth set of one or more operations; and
   wherein the results of performing the first set of one or more operations on the markup language data source are based at least in part on the results of the middle-tier engine performing the fourth set of one or more operations on the data related to the fourth set of one or more operations.

16. The method of claim 1, wherein the certain operations comprise a fourth set of one or more operations that are to be performed on a second data source; and wherein the method further comprises:
   determining that the first server is capable of performing the fourth set of one or more operations;
   determining that the first set of one or more operations require results from the fourth set of one or more operations;
   retrieving data related to the fourth set of one or more operations from the second data source; and
   performing a cost calculation to determine whether to request that the first server performs the fourth set of one or more operations;

based at least in part on the cost calculation, performing one of:
including the data related to the fourth set of one or more operations in the request sent to the first server; and
performing, at the middle-tier engine, the fourth set of one or more operations on the data related to the fourth set of one or more operations; and including, in the request sent to the first server, the results of the middle-tier engine performing the fourth set of one or more operations on the data related to the fourth set of one or more operations.

17. The method of claim 1, wherein the first set of one or more operations are included in the query in an XQuery format.

18. The method of claim 1, wherein the first set of one or more operations are included in the query in an XQueryX format.

19. The method of claim 1, wherein the first set of one or more operations are included in the query at least in part in an XPath format.

20. The method of claim 1, wherein the markup language data source is an XML data source.

21. The method of claim 1, wherein the first server comprises an XQuery enabled database server.

22. The method of claim 1, wherein the first server comprises an XQueryX-enabled database.

23. The method of claim 1, wherein the first server comprises an XPath enabled database.

24. The method of claim 1, wherein the step of generating results for the query comprises generating results in a markup language associated with the markup language data source.

25. The method of claim 1, wherein the step of generating results for the query comprises generating results in one or more of plain text, binary, and compressed forms.

26. The method of claim 1, wherein the certain operations comprise a fourth set of one or more operations that are to be performed on a second data source; and wherein the markup language data source is separate from the second data source.

27. The method of claim 1, wherein the certain operations comprise a fourth set of one or more operations that are to be performed on a second data source; and wherein the second data source comprises the markup language data source.

28. The method of claim 1, wherein the certain operations comprise a fourth set of one or more operations that are to be performed on a second data source; and wherein the first server is implemented as part of a second server that manages the second data source.

29. The method of claim 1, wherein the certain operations comprise a fourth set of one or more operations that are to be performed on a second data source; and wherein the first server is implemented separately from a second server that manages the second data source.

30. The method of claim 1 wherein at least one execution plan, of the plurality of execution plans, indicates an order in which multiple entities of the plurality of entities are to perform respective multiple subsets of said certain operations.

31. A method of processing a query, comprising the computer-implemented steps of:
receiving the query, wherein the query specifies certain operations to be performed, wherein the certain operations comprise (a) a first set of one or more operations that are to be performed on a markup language data source and (b) a second set of one or more operations that are to be performed on a second data source that is different than the markup language data source;
determining that the first set of one or more operations and the second set of one or more operations cannot be preformed by a single database server;
generating a plurality of execution plans for executing the query, wherein the plurality of execution plans include:
a first execution plan indicating that the first set of one or more operations are to be performed at a first server; and
a second execution plan indicating that the first set of one or more operations are to be performed at a second server;
selecting, based on a particular set of criteria, the first execution plan from the plurality of execution plans;
wherein selecting the first execution plan from the plurality of execution plans comprises one or more of:
selecting the first execution plan based at least in part on costs determined for the plurality of execution plans; and
selecting the first execution plan by using one or more rules to determine which execution plan, of the plurality of execution plans, to use for executing the query;
determining that a third set of one or more operations are to be performed at a middle-tier engine, wherein the second set of one or more operations include all operations in the third set of one or more operations, and the third set of one or more operations include no operation that are in the first set of one or more operations;
sending a request to the first server to perform the first set of one or more operations;
receiving a response to the request, wherein the response contains results of performing the first set of one or more operations on the markup language data source; and
generating results for the query based at least in part on the results of performing the first set of one or more operations; and
wherein the steps of generating the plurality of execution plans and selecting the first execution plan are performed by one or more computing devices.

32. A machine-readable storage medium storing one or more sequences of instructions which, when executed by one or more processors, causes the one or more processors to perform the method recited in claim 1.

33. A machine-readable storage medium storing one or more sequences of instructions which, when executed by one or more processors, causes the one or more processors to perform the method recited in claim 2.

34. A machine-readable storage medium storing one or more sequences of instructions which, when executed by one or more processors, causes the one or more processors to perform the method recited in claim 3.

35. A machine-readable storage medium storing one or more sequences of instructions which, when executed by one or more processors, causes the one or more processors to perform the method recited in claim 4.

36. A machine-readable storage medium storing one or more sequences of instructions which, when executed by one or more processors, causes the one or more processors to perform the method recited in claim 5.

37. A machine-readable storage medium storing one or more sequences of instructions which, when executed by one or more processors, causes the one or more processors to perform the method recited in claim 6.

38. A machine-readable storage medium storing one or more sequences of instructions which, when executed by one or more processors, causes the one or more processors to perform the method recited in claim 7.

39. A machine-readable storage medium storing one or more sequences of instructions which, when executed by one or more processors, causes the one or more processors to perform the method recited in claim 8.

40. A machine-readable storage medium storing one or more sequences of instructions which, when executed by one or more processors, causes the one or more processors to perform the method recited in claim 9.

41. A machine-readable storage medium storing one or more sequences of instructions which, when executed by one or more processors, causes the one or more processors to perform the method recited in claim 10.

42. A machine-readable storage medium storing one or more sequences of instructions which, when executed by one or more processors, causes the one or more processors to perform the method recited in claim 11.

43. A machine-readable storage medium storing one or more sequences of instructions which, when executed by one or more processors, causes the one or more processors to perform the method recited in claim 12.

44. A machine-readable storage medium storing one or more sequences of instructions which, when executed by one or more processors, causes the one or more processors to perform the method recited in claim 13.

45. A machine-readable storage medium storing one or more sequences of instructions which, when executed by one or more processors, causes the one or more processors to perform the method recited in claim 14.

46. A machine-readable storage medium storing one or more sequences of instructions which, when executed by one or more processors, causes the one or more processors to perform the method recited in claim 15.

47. A machine-readable storage medium storing one or more sequences of instructions which, when executed by one or more processors, causes the one or more processors to perform the method recited in claim 16.

48. A machine-readable storage medium storing one or more sequences of instructions which, when executed by one or more processors, causes the one or more processors to perform the method recited in claim 17.

49. A machine-readable storage medium storing one or more sequences of instructions which, when executed by one or more processors, causes the one or more processors to perform the method recited in claim 18.

50. A machine-readable storage medium storing one or more sequences of instructions which, when executed by one or more processors, causes the one or more processors to perform the method recited in claim 19.

51. A machine-readable storage medium storing one or more sequences of instructions which, when executed by one or more processors, causes the one or more processors to perform the method recited in claim 20.

52. A machine-readable storage medium storing one or more sequences of instructions which, when executed by one or more processors, causes the one or more processors to perform the method recited in claim 21.

53. A machine-readable storage medium storing one or more sequences of instructions which, when executed by one or more processors, causes the one or more processors to perform the method recited in claim 22.

54. A machine-readable storage medium storing one or more sequences of instructions which, when executed by one or more processors, causes the one or more processors to perform the method recited in claim 23.

55. A machine-readable storage medium storing one or more sequences of instructions which, when executed by one or more processors, causes the one or more processors to perform the method recited in claim 24.

56. A machine-readable storage medium storing one or more sequences of instructions which, when executed by one or more processors, causes the one or more processors to perform the method recited in claim 25.

57. A machine-readable storage medium storing one or more sequences of instructions which, when executed by one or more processors, causes the one or more processors to perform the method recited in claim 26.

58. A machine-readable storage medium storing one or more sequences of instructions which, when executed by one or more processors, causes the one or more processors to perform the method recited in claim 27.

59. A machine-readable storage medium storing one or more sequences of instructions which, when executed by one or more processors, causes the one or more processors to perform the method recited in claim 28.

60. A machine-readable storage medium storing one or more sequences of instructions which, when executed by one or more processors, causes the one or more processors to perform the method recited in claim 29.

61. A machine-readable storage medium storing one or more sequences of instructions which, when executed by one or more processors, causes the one or more processors to perform the method recited in claim 30.

62. A machine-readable storage medium storing one or more sequences of instructions which, when executed by one or more processors, causes the one or more processors to perform the method recited in claim 31.

\* \* \* \* \*

UNITED STATES PATENT AND TRADEMARK OFFICE
CERTIFICATE OF CORRECTION

PATENT NO. : 7,668,806 B2
APPLICATION NO. : 10/948536
DATED : February 23, 2010
INVENTOR(S) : Zhen Hua Liu et al.

It is certified that error appears in the above-identified patent and that said Letters Patent is hereby corrected as shown below:

On page 3, under "Other Publications", in column 2, line 26, delete "VLBD" and insert -- VLDB --, therefor.

On page 3, under "Other Publications", in column 2, line 42, delete "XQuey" and insert -- XQuery --, therefor.

On page 4, under "Other Publications", in column 1, line 12, delete "currnet" and insert -- current --, therefor.

On page 4, under "Other Publications", in column 1, line 13, delete "Preli minary" and insert -- Preliminary --, therefor.

Signed and Sealed this

Twenty-first Day of September, 2010

David J. Kappos
*Director of the United States Patent and Trademark Office*